2,990,418
Patented June 27, 1961

2,990,418
GLYCERYLMANGANESE TETRACARBONYLS
AND THEIR PREPARATION
William R. McClellan, Kennett Square, Pa., assignor to
E. I. du Pont de Nemours and Company, Wilmington,
Del., a corporation of Delaware
No Drawing. Filed Apr. 22, 1960, Ser. No. 23,885
5 Claims. (Cl. 260—429)

This invention relates to a new class of organometallic compounds and more particularly to new organomanganese carbonyls and a method for the preparation thereof.

Kealy and Pauson, Nature 168, 1039 (1951), announced the preparation of a stable organometallic iron compound, dicyclopentadienyliron. With this announcement, an entirely new field of organometallic chemistry was opened and subsequent reports describe the preparation of a wide variety of the so-called metallocene compounds wherein one or more metal atoms are linked by non-classical bonding to one or more ligand moieties of the cyclopentadienyl type and also of the benzene type, for instance, in the compound dibenzenechromium.

Continuing research has established that these organometallic compounds are stable by virtue of the non-classical metal to ligand bonds involving π-electron bondings between the metal and all carbons of the five- or six-membered rings involved. Those compounds wherein two such ligands are present have frequently been referred to as "sandwich" compounds, since the metal atoms are centrally placed and the five- or six-membered rings are planar and placed parallel to each other on opposite sides of the metal atom and equidistant therefrom. Continuing work has revealed some so-called "half-sandwich" compounds of the same general type can exist wherein there is only one such ligand moiety. Stable compounds of these types have been reported from substantially all the transition metal groups of the periodic table. This vast amount of work has been well summarized in two recent articles—see Pauson, Quart. Revs. Chem. Soc. 9, 399 (1955), and Fischer, Angew. Chem. 67, 475 (1955).

It is apparent from all this work that the ligands necessary for the formation of such stable organometallic compounds involving the non-classical metal to ligand linkages have two necessary requirements, viz., (1) that they contain a multiplicity of carbon-carbon multiple bonds and (2) that they be cyclic.

Some time prior to this recent work stable metal carbonyl complexes of dienes had been reported. Thus, Veltman in U.S. Patent 2,409,167 reported the successful formation of stable diolefin complexes with the carbonyls of iron, cobalt, and nickel. Specifically, from butadiene and iron pentacarbonyl the compound

[Fe(CO)$_3$]$_5$[C$_4$H$_6$]$_6$ was prepared. Still earlier Reihlen et al., Ann. 482,169 (1930), reported the formation from butadiene and iron pentacarbonyl of the stable complex C$_4$H$_6$Fe(CO)$_3$.

With the advent of the above-described recent research on these stable organometallic compounds involving non-classical metal to ligand linkages, which include in many instances carbonyl compounds, the compounds of Reihlen et al. were reinvestigated. Hallam and Pauson, J. Chem. Soc. 1958, 642, report that the butadieneiron tricarbonyl complex does involve similar non-classical metal to ligand bondings and is in fact an open-chain, half-sandwich metal complex. But even though the ligand moiety in such a stable complex structure is acyclic, it is to be noted that a plurality of carbon-carbon multiple linkages is involved. Furthermore, these authors state that:

". . . According to our views, the conjugated nature of the diene system is an essential feature for the formation of compounds like butadieneiron tricarbonyl."

It is also to be noted that such complexes differ in another respect markedly from the metallocenes first discussed in that there is no hydrogen removal from the ligand moiety, i.e., the latter compounds are true complexes molecularly.

In direct contradiction of the foregoing chemistry and the structural requirements necessarily adduced therefrom for the formation of stable organometallic compounds involving non-classical metal to ligand linkages, it has now been found that glycerylmanganese tetracarbonyl compounds not only can be prepared, but are quite stable and useful compounds and exhibit an open-chain, half-sandwich structure wherein the organic ligand moiety is not only acyclic but as an entering radical contains only one carbon-carbon multiple link. These compounds can be represented structurally by the following schematic formula:

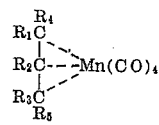

wherein the R's, alike or different, are used to represent hydrogen, halogen or monovalent hydrocarbyl radicals, said radicals being free of aliphatic unsaturation and generally of no more than eight carbons, and the — — — bonds are used to indicate the non-classical manganese to ligand moiety linkages involving π-electrons.

A particularly outstanding class of these new manganese carbonyls are those wherein R$_1$ and R$_4$ are both hydrogen since the necessary intermediates are more readily available and the reaction proceeds more rapidly and smoothly. An especially outstanding class of these new glycerylmanganese carbonyls are those wherein R$_1$, R$_2$ and R$_4$ are hydrogen for the same reasons just given. Generally speaking, no more than three of the R's will be halogen. Similarly, while all five R's can be monovalent hydrocarbyl, steric factors tend to make the synthesis of such products difficult, and, generally speaking, no more than four of the R's will be hydrocarbyl in any one compound.

These new glycerylmanganese tetracarbonyl compounds can be readily prepared by the direct metathesis between a suitable metal salt of manganese pentacarbonyl hydride and the requisite allyl or substituted allyl halide or similar ester coreactant. This preparative route accords to the stoichiometry of the following reaction equations:

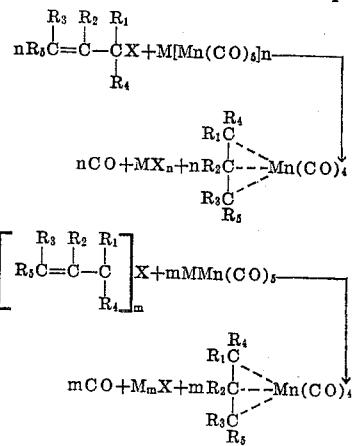

wherein: the R's have their previous significance; M is used to represent a metal, generally of groups I–A and II–A, especially the former, of the periodic table, and of atomic number 3 to 56; X is used to represent an acid anion, particularly a halogen of atomic number from 17 to 53, and especially of atomic numbers 17 and 35; and $n$ and $m$ are whole integers, usually from 1–2, corresponding to the formal valences, respectively, of the metal M and the acid anion X.

The periodic table referred to herein is the one appearing in Deming's "General Chemistry," John Wiley and Sons, Inc., 5th ed., chap. 11.

Because of the peculiar nature of the structure of these new manganese carbonyls, a problem arises in the proper nomenclature thereof. Thus, the organic moiety of the monosaturated ester coreactant can be quite properly described in the generic sense as a 2-alkenyl or substituted 2-alkenyl or allyl or substituted allyl ester, including in the specific sense the halide esters, e.g., allyl chloride. Such nomenclature indicates clearly that there is a monovalent, at least 3-carbon radical linked singly to the ester moiety, said monovalent radical having a carbon-carbon double bond between the 2- and 3-carbons thereof. Furthermore, the carbon linkage from the 1-carbon to the ester moiety is a covalent link. However, when this radical forms one of the new manganese tetracarbonyls of the present invention, the double bond becomes delocalized, i.e., is not between the 2- and 3-carbons but is portioned out between the 1-, 2-, and 3-carbons. Furthermore, the single covalent bond from the 1-carbon no longer maintains such a status and is likewise portioned out among the 1-, 2-, and 3-carbons so that together the valence nature of one-half of the entering double bond and all the valence nature of the entering 1-radical bond in the organic moiety are distributed evenly between the 1-, 2-, and 3-carbons and form the equal, non-classical, metal-to-ligand linkages which together bond the organic moiety to the manganese atom of the above-described structure. With such considerations, it becomes apparent that the 1- and 3-carbons have become symmetrical, and accordingly in the manganese tetracarbonyl end products it would not be possible to distinguish a substituent which entered on the 1-carbon as being present in the end product either on the 1- or 3-carbons. Thus, to give a specific example, if cinnamyl chloride, which can be called 3-phenyl-2-propenyl chloride or γ-phenylallyl chloride, is used as the organic coreactant with the manganese pentacarbonyl salt, the product could be described as either the 3-phenylallylmanganese tetracarbonyl or the 1-phenylallylmanganese tetracarbonyl. The same does not apply for substituents on the 2-carbon.

There is accepted radical terminology which is possibly more indicative of the just-described type of radical here involved in that the term "glyceryl" has accepted usage as applying to the radical

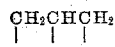

Accordingly, the present products can be regarded as glyceryl and substituted glycerylmanganese tetracarbonyls with only the proviso that it be accepted that the inference behind the term "glyceryl" pertains to the three carbon structure of the radical pictured above, but does not include the concept that the three bonds indicated are monovalent and covalent. Instead, it is inferred that the three carbon-to-metal linkages in these products are equal and indistinguishable as just described above. Precedent for such a procedure exists in the by-now accepted terminology for describing the organic portions of the metallocene sandwich and half-sandwich compounds. As described above, linkage from the metal to the organic portions of such molecules is similar to the non-classical linkages here involved. Such compounds are named with normal radical nomenclature in that the organic portion is named as a suitably substituted cyclopentadienyl radical. The characteristic "-yl" radical suffix is used despite the fact that the radical involved in the final products, while entering as a monovalent, covalent radical with the formal covalent linkage pendent on only one of the ring carbons, is in the final product a monovalent radical wherein the linkages to the metal are not covalent and stem equally from all five ring carbons.

With the above considerations, an attempt will be made to refer to the compounds generically as glyceryl and substituted glycerylmanganese tetracarbonyls. In the specific instances the compounds will be named in any one of the three fashions, i.e., according to the allyl and substituted allyl, the 2-alkenyl, and/or the glyceryl and substituted glyceryl nomenclatures.

These new glycerylmanganese tetracarbonyls, the preparation thereof, and the utility thereof are illustrated in greater detail in the following examples in which the parts given are by weight. These examples are submitted as illustrative only and are in no way to be interpreted as limiting the invention.

*Example I*

A mixture of 4.13 parts of dimanganese decacarbonyl and 224 parts of a 2% sodium amalgam (approximately a tenfold molar excess based on the carbonyl) in 150 parts of tetrahydrofuran was stirred in a glass reactor under a nitrogen atmosphere for 1.5 hours with a high speed stirrer. The reaction mixture was filtered under nitrogen and the filtrate containing the sodium manganese pentacarbonyl added under nitrogen to a glass reactor containing 2.6 parts (1.6 molar proportions based on the carbonyl) of allyl chloride. The resultant reaction mixture was held at room temperature under an atmosphere of nitrogen for 45 minutes, then heated at the reflux under nitrogen for eight hours, and the gas evolved during this time collected. A total of 470 parts by volume, corresponding to 470 parts by volume of displaced mercury, of carbon monoxide gas was evolved which corresponds closely to two molar proportions of carbon monoxide per mole of dimanganese decacarbonyl charged, i.e., one mole of carbon monoxide for each molar proportion of manganese. The tetrahydrofuran solvent was then removed by distillation. Continued distillation of the resultant residue afforded 2.5 parts (63% conversion based on the manganese carbonyl) of allylmanganese tetracarbonyl, or more precisely glycerylmanganese tetracarbonyl, as a clear, pale yellow liquid boiling at 66° C. under a pressure corresponding to 14 mm. of mercury. On cooling, the glycerylmanganese tetracarbonyl solidified to a solid melting at 38–41° C.

*Analysis.*—Calcd. for $C_3H_5Mn(CO)_4$: C, 40.4%; H, 2.4%; Mn, 26.4%. Found: C, 41.2%; H, 2.7%; Mn, 25.8%.

The nuclear magnetic resonance spectrum of the product showed three different kinds of hydrogen in a 2:2:1 ratio. The infrared spectrum of the glycerylmanganese tetracarbonyl exhibited absorption peaks at 4.75, 4.83, and 4.90 microns and a broad band at 5.13 microns characteristic of metal carbonyls. There were no absorption peaks characteristic of any other type of carbonyl groups. There was an absorption peak at 6.64 microns attributable to the delocalized double bond. There were no absorption peaks characteristic of methyl groups or normal open-chain carbon-carbon unsaturation.

*Example II*

A solution of 20.1 parts of dimanganese decacarbonyl in 225 parts of tetrahydrofuran was mixed in a glass reactor under a positive pressure of nitrogen with 300 parts of a 2% sodium amalgam (approximately 2.5 molar proportions based on the carbonyl) for 25 minutes at room temperature by means of high speed stirrer. The reaction mixture was then heated to a temperature of 55° C. while high speed stirring was continued for an additional 30 minutes. The resulting reaction mixture was centrifuged and the resulting solution from the centrifuging operation containing the sodium manganese pentacarbonyl was decanted under nitrogen into a glass reactor containing 7.65 parts (an equimolar proportion based on the manganese) of allylchloride. The reaction mixture was allowed to stand for 18 hours at room temperature under nitrogen and then heated at the reflux while the carbon monoxide gas liberated during the reaction was collected. After a period of 13.5 hours under these conditions, a total of 1900 parts by volume, corresponding to 1900 parts by volume of displaced mercury, of gaseous carbon monoxide was collected (corresponding to 0.9 molar proportion based on the manganese) and the rate of gas evolution had become quite slow. After the tetrahydrofuran reaction solvent was removed by distillation, continued distillation of the resultant residue afforded 15.5 parts (72% of theory) of glycerylmanganese tetracarbonyl as a clear, pale yellow liquid boiling at 60–62° C. under a pressure corresponding to 9 mm. of mercury. The glyceryl manganese tetracarbonyl solidified directly as it was collected in the receiving flask. The infrared spectrum of the glyceryl manganese tetracarbonyl was identical with that of the product described in Example I.

In contrast, a substantially identical reaction carried out with substantially identical proportions of additional samples of the same reactants, varying only in that the 13.5 hour refluxing period was omitted, afforded allylmanganese pentacarbonyl as a yellow liquid boiling at 66° C. under a pressure corresponding to 14 mm. of mercury. The allylmanganese pentacarbonyl remained liquid even on cooling to 0° C.

*Analysis.*—Calcd. for $C_3H_5Mn(CO)_5$: C, 40.7%; H, 2.2%; Mn, 23.2%. Found: C, 41.4%; H, 2.6%; Mn, 23.1%.

The infrared spectrum of the allylmanganese pentacarbonyl exhibited absorption peaks corresponding to normal olefinic double bonds and normal saturated C—H absorption. There was no absorption corresponding to the non-classical metal to ligand bondings of the sandwich-type complexes.

*Example III*

In a glass reactor under a positive pressure of nitrogen a mixture of 21.8 parts of the sodium derivative of manganese pentacarbonyl hydride and 9.1 parts (an equimolar proportion based on the carbonyl hydride) of crotyl chloride in 135 parts of tetrahydrofuran was heated at the reflux for 23 hours during which time carbon monoxide was evolved. The resultant reaction mixture was filtered under nitrogen and the tetrahydrofuran solvent removed from the filtrate by distillation. Continued distillation of the residue afforded 11 parts (45% conversion) of crude 2-butenylmanganese tetracarbonyl (α-methylglycerylmanganese tetracarbonyl) as a pale yellow liquid boiling at 32–34° C. under a pressure corresponding to 0.25 mm. of mercury. Redistillation of the product afforded pure 2-butenylmanganese tetracarbonyl as a pale yellow liquid boiling at 57° C. under a pressure corresponding to 4 mm. of mercury.

*Analysis.*—Calcd. for $C_4H_7Mn(CO)_4$: C, 43.2%; H, 3.2%; Mn, 24.8%; M.W., 222. Found: C, 43.8%; H, 3.1%; Mn, 23.8%; M.W., 206.

The infrared spectrum of the 2-butenylmanganese tetracarbonyl exhibited absorption peaks at 4.75 and 4.84 microns and a broad band at 5.15 microns characteristic of metal carbonyls. There were no absorption peaks characteristic of any other type of carbonyl. The spectrum exhibited an absorption peak at 6.58 microns attributable to the delocalized double bond. There was an absorption peak at 7.25 microns characteristic of a normal methyl group bonded to carbon. There were no absorption peaks characteristic of normal open-chain carbon-carbon unsaturation.

*Example IV*

To a solution of 1.79 parts of the sodium derivative of manganese pentacarbonyl hydride in 18 parts of anhydrous tetrahydrofuran was added 0.72 part of β-methallyl chloride and the reaction mixture allowed to stand at room temperature under anhydrous conditions overnight. The reaction mixture was then heated at the reflux (67° C. for tetrahydrofuran) for 24 hours, during which time carbon monoxide was liberated. The tetrahydrofuran solvent was removed by distillation, and on continued distillation there was obtained one part of β-methallylmanganese tetracarbonyl (β-methylglycerylmanganese tetracarbonyl) as a pale yellow liquid boiling at 50–51° C. under a pressure corresponding to 2.5 mm. of mercury. The infrared spectrum of the β-methallylmanganese tetracarbonyl (or isobutenylmanganese tetracarbonyl) exhibited absorption peaks at 4.75 and 4.82 microns and a broad band at 5.15 microns characteristic of metal carbonyls. There were no absorption peaks characteristic of any other type carbonyl. There was an absorption peak at 6.70 microns attributable to the delocalized double bond, and an absorption peak at 7.72 microns characteristic of a normal methyl group linked to carbon. There were no absorption peaks characteristic of normal open-chain carbon-carbon unsaturation. The spectrum shows that, while closely related, the 2-butenyl product of Example III and the isobutenyl product of the present example are different.

*Example V*

To a solution of 2.18 parts of the sodium derivative of manganese pentacarbonyl hydride in 21 parts of tetrahydrofuran was added 1.48 parts of cinnamyl chloride (i.e., 3-phenyl-2-propenyl chloride) and the mixture allowed to stand at room temperature for 45 minutes. The reaction mixture was then heated at the reflux for five hours, during which time carbon monoxide was evolved. After removal of the tetrahydrofuran solvent by distillation, continued distillation afforded a small amount of an orange-yellow solid (identified as dimanganese decacarbonyl by mixed melting point with an authentic sample). Continued distillation afforded 1.25 parts of α-phenylglycerylmanganese tetracarbonyl as a pale yellow liquid boiling at 90° C. under a pressure corresponding to 0.1 mm. of mercury. The infrared spectrum of the cinnamylmanganese tetracarbonyl product exhibited an absorption peak at 4.83 microns and a broad band at 5.10 microns characteristic of metal carbonyls. There were no absorption peaks characteristic of any other type carbonyl. There were absorption peaks at 6.25, 6.35, and 6.70 microns characteristic of aromatic carbon-carbon multiple links. There was an absorption peak at 6.57 microns attributable to the delocalized double bond. There were absorption peaks at 13.20 and 14.45 microns characteristic of monosubstituted aromatic compounds. There were no absorption peaks characteristic of normal open-chain carbon-carbon unsaturation.

*Example VI*

A mixture of 3.4 parts of lithium manganese pentacarbonyl, i.e., the lithium salt of manganese pentacarbonyl hydride, in about 27 parts of anhydrous tetrahydrofuran and 1.9 parts (an equimolar proportion based on the carbonyl) of 1,3-dichloro-2-propene was stirred under a positive pressure of nitrogen at 25° C. for three hours. The tetrahydrofuran solvent was then removed by distillation under reduced pressure at 25–30° C. n-Pentane was then added to the residue to precipitate a white solid which was removed by filtration. There was thus obtained 0.6 part versus a theoretical yield of 0.72 part of lithium chloride. The filtrate was then concentrated by distillation. Continued distillation through a short path still afforded 3.3 parts (72% of theory based on the lithium manganese pentacarbonyl) of γ-chloroallylmanganese pentacarbonyl as a yellow liquid boiling at 55° C. under a pressure corresponding to 0.5 mm.

*Analysis.*—Calcd. for $C_8H_4ClO_5Mn$: C, 35.5%; H, 1.5%; Cl, 13.1%; Mn, 20.3%. Found: C, 35.7%; H, 1.8%; Cl, 11.2%; Mn, 19.1%.

The infrared spectrum showed absorption bands in the regions characteristic for saturated C—H linkages, olefinic double bonds, C—Cl linkages, and terminal metal carbonyl. The n-m-r spectrum showed three different kinds of hydrogen in a 2:1:1 ratio, indicative of two equivalent hydrogens of the saturated CH type and two non-equivalent hydrogens of the olefinic type.

Heating of a 1.9-part portion of the above γ-chloroallylmanganese pentacarbonyl under nitrogen for three hours at 85–90° C. caused the evolution of 125 parts by volume (80% of theory) of carbon monoxide. Upon distillation of the residue in a short path still, there was obtained 0.7 part (41% of theory) of α-chloroglycerylmanganese tetracarbonyl as a yellow liquid boiling at 85° C. under a pressure corresponding to 6 mm. of mercury.

*Analysis.*—Calcd. for $C_7H_4ClO_4Mn$: C, 34.7%; H, 1.7%; Mn 22.6%. Found: C, 34.4%; H, 1.6%; Mn, 23.1%.

The infrared spectrum of the product showed absorption bands in areas characteristic for delocalized carbon-carbon unsaturation, an aromatic type C—Cl bond, and strong terminal metal carbonyl.

In the final glyceryl products, because of the delocalized nature of the bonding to the metal, it should be noted that the terminal carbons in the glyceryl moiety are equivalent with respect to the metal as regards to substituents thereon. Accordingly, while we have named the product the α-chloro compound, it could equally well be called the γ-chloro compound. Good chemical nomenclature calls for the lowest position assignable to a substituent and accordingly the α is believed preferable.

*Example VII*

A mixture of four parts of γ-methylcrotyl bromide, i.e., 1-bromo-3-methyl-2-butene, and 4.45 parts (an equimolar proportion based on the bromide) of lithium manganese pentacarbonyl in about 39 parts of anhydrous tetrahydrofuran was held overnight at 0° C. under an atmosphere of argon. The tetrahydrofuran solvent was then removed by distillation under reduced pressure at 20° C. The residue was heated at 68–78° C. for one hour, during which time 380 parts by volume (80% of theory) of carbon monoxide was evolved. Distillation of the residue afforded 3.9 parts (75% of theory) of α,α-dimethylglycerylmanganese tetracarbonyl as a reddish-brown liquid boiling at 51° C. under a pressure corresponding to 1 mm. of mercury which solidified at reduced temperatures to a red-brown solid melting at 12–14° C.

*Analysis.*—Calcd. for $C_9H_9O_4Mn$: C, 45.8%; H, 3.8%; Mn, 23.2%. Found: C, 45.4%; H, 3.8%; Mn, 22.9%.

The infrared spectrum of the α,α-dimethylglycerylmanganese tetracarbonyl showed absorption bands in those frequencies characteristic for a delocalized carbon-carbon unsaturation. The infrared spectrum was identical to that exhibited by another sample of the compound made by an alternative synthesis from isoprene, i.e., 2-methyl-1,3-butadiene, and manganese pentacarbonyl hydride, followed by decarbonylation of the intermediate pentacarbonyl product formed.

The glycerylmanganese tetracarbonyls of this invention are generically useful as antiknock agents for use in hydrocarbon fuels for internal combustion engines and are generically soluble and easily carburetted in such fuels when used in all conventional internal combustion engines. The good hydrocarbon or gasoline solubility plus the ready carburetion of these alkenylmanganese tetracarbonyls make them particularly outstanding in such uses. Thus, when tested in a synthetic hydrocarbon fuel boiling in the gasoline range composed of 19 volume per cent paraffins, 15 volume percent naphthenes, 30 volume percent olefins, and 36 volume percent aromatics according to the F-1 Research Method (ASTM D-908-51) at a concentration such as to give 0.5 gram of manganese/gallon of fuel (corresponding to about 2.0 g. of the compound/gallon of fuel), the allylmanganese tetracarbonyl raised the performance number of the fuel from a control value of 82.4 to a value of 90.9. Under exactly the same conditions the maximum permitted amount of tetraethyllead for automotive fuels, i.e., 3 ml. of tetraethyllead/gallon (corresponding to 5.0 g. of tetraethyllead and 3.2 g. of lead/gallon of fuel), raised the performance number of the synthetic hydrocarbon fuel to a value of 103.9. Under exactly the same conditions the addition of allylmanganese tetracarbonyl in amount corresponding to 0.5 g. of manganese/gallon of fuel to the synthetic hydrocarbon fuel containing the 3 ml. of tetraethyllead/gallon raised the performance number of the fuel from the above-indicated 103.9 with lead alone to a value of 106.3 with both the tetraethyllead and the allylmanganese tetracarbonyl.

Under exactly the same conditions the crotylmanganese tetracarbonyl of Example III at a concentration corresponding to 0.5 g. of manganese/gallon of fuel raised the performance number of the fuel, unleaded, from a value of 82.4 to a value of 89.7 and similarly raised the performance number of the leaded fuel (3 ml. of tetraethyllead/gallon) from a value of 103.9 to a value of 105.4. These performance number values are in accord with the Army-Navy Performance Numbers as defined in Tables VII and VIII in the ASTM Aviation Method (D–614–49T) as recorded in the ASTM Manual of Engine Test Methods for Rating Fuels, published by the American Society for Testing Materials, October 1952.

It should be understood that this invention is generic to the glycerylmanganese tetracarbonyls, essentially free from pentacarbonyls and tricarbonyls, in which the glyceryl moiety is bonded to the manganese by non-classical metal to ligand links, i.e., the structure of these manganese tetracarbonyls possesses an open-chain, acyclic, half-sandwich structure. While these compounds can be referred to properly in the generic sense as 2-alkenyl compounds, it is apparent from the foregoing structures and discussions that the alkenyl moiety has no classical carbon-carbon double bond, i.e., that the double bond is delocalized. The 1- and 3-carbons of the 2-alkenyl radical can each carry one halogen, up to two hydrogens or up to two monovalent hydrocarbyl radicals, said radicals being free of aliphatic unsaturation and having generally no more than 8 carbons. Likewise, the 2-carbon can carry any single one of the substituents mentioned above. Because of readier availability of the necessary intermediates and the greater reactivity thereof in forming the new 2-alkenylmanganese tetracarbonyl compounds of the present invention, the preferred compounds are those wherein the 1-carbon of the 2-alkenyl moiety carries two hydrogens. An especially preferred class of these new compounds are those where the 2-alkenyl moiety carries only hydrogen on the 1- and 2-carbons.

As already indicated, the new glycerylmanganese tetracarbonyls of my invention can be readily prepared by direct metathesis between the requisite 2-alkenyl ester and a metal salt of manganese pentacarbonyl hydride. Generally the metal will be an alkali metal or alkaline earth metal, preferably the former and especially the sodium and potassium salts of manganese pentacarbonyl hydride. These carbonyl hydride salts or derivatives can be prepared in situ or can be prepared ahead of time separately, purified, and used directly in the reaction. The preparation of the carbonyl hydride salts is well known in the art—see, for instance, Hieber et al., Z. fur Naturf. 13b, 339 (1958) and Closson et al., J. Org. Chem. 22, 598 (1958). In the case of the most preferred, for reasons of availability, manganese carbonyl hydride salts, i.e., sodium manganese pentacarbonyl hydride, the salt will conveniently be prepared by reaction of a sodium amalgam with manganese carbonyl.

The metathesis between manganese pentacarbonyl hydride salt and the requisite 2-alkenyl ester will normally involve at least equimolar proportions of the two reactants. This metathetic reaction will normally be carried out in solution in a suitable inert solvent. The reaction temperature can be varied from room temperature to elevated temperatures in the range 125–150° C., or so. Reaction times will vary depending on the relative reactivity of the particular manganese carbonyl hydride salt and the particular alkenyl ester involved. At the higher temperatures, reaction will be complete with the more reactive manganese hydride salts and alkenyl esters in a matter of a few hours. With the less reactive intermediates, especially at the lower temperatures, reaction times will be longer and will frequently require a few days' time. Generally, by appropriate choice of the coreactants and the reaction temperature, the reaction can be achieved in a few hours to 24 hours' time.

The reaction conditions as described just previously are obviously versatile, and a wide variety of conditions can be chosen. There is one critical factor for success in the formation of the glyceryl manganese tetracarbonyls and this is that irrespective of the nature of the two coreactants or of the reaction temperature or time, reaction must be continued until substantially one molar proportion of gaseous carbon monoxide per molar proportion of manganese is evolved. The reaction is substantially completed to the formation of the glycerylmanganese tetracarbonyl when 0.90 molar proportion of carbon monoxide has been evolved, and it is complete when 1.0 molar proportion of carbon monoxide has been evolved. It is necessary that this proportion of carbon monoxide be evolved from the reaction mixture in order to be certain of being able to isolate and characterize the glycerylmanganese tetracarbonyl. Unless this degree of completion of the reaction to form the tetracarbonyl is achieved, undesirable by-products are obtained from which it is difficult to isolate the desired glycerylmanganese tetracarbonyl.

A wide variety of inert reaction solvents can be used. Suitable classes include the aliphatic cycloaliphatic, aromatic, alkaromatic, and araliphatic hydrocarbon ethers and hydrocarbons and the like. A particularly valuable class, because of ready availability and desirable chemical inertness, comprises the hydrocarbon ethers, such as tetrahydrofuran, dioxane, diethyl ether, di-n-butyl ether, dicyclohexyl ether, and the like.

The organic portion of the molecule in the new glycerylmanganese tetracarbonyls of the present invention can be supplied by any source of a 2-alkenyl ion. Under the metathetical conditions previously discussed for the preparation of these new products involving reaction with the alkali or alkaline earth metal salt of manganese pentacarbonyl hydride, a convenient source of such 2-alkenyl ions is found in the 2-alkenyl halides and in 2-alkenyl esters of other acids, e.g., the sulfates, acetates, phosphates, propionates, and the like.

The most convenient source of the necessary 2-alkenyl radicals is found in the 2-alkenyl halides wherein the halogen is from atomic number 17 to 53. Particularly outstanding in this group, because of easier availability, are the 2-alkenyl chlorides and bromides. Costs per se and lower weight loss both favor the chlorides. Suitable specific additional examples of the 2-alkenyl esters which can be used in the formation of other 2-alkenyl-manganese tetracarbonyls include allyl sulfate, allyl acetate and especially the halides such as allyl bromide, β-methallyl chloride, β-methallyl bromide, cinnamyl iodide, crotyl bromide, α-phenylallyl chloride, α, γ-diphenylallyl chloride, β-cyclohexylallyl bromide, 1-chlorooctene-2, 3-chlorooctene-1, 4-chloro-3-methylpentene-2, 1-bromo-5-(4-methylphenyl)pentene-2, α-methyl-γ-cyclohexylallyl chloride.

Using the aforesaid described reaction conditions and coreactants, there can be obtained additional examples of the glycerylmanganese tetracarbonyls of the present invention. Thus, β-methallylmanganese tetracarbonyl can be obtained from calcium bis(manganese pentacarbonyl) and two molar proportions of β-methallyl chloride. Cinnamyl, i.e., 3-phenylallylmanganese tetracarbonyl, can be obtained from the potassium salt of manganese pentacarbonyl hydride and cinnamyl iodide. The same product can also be obtained from α-phenylallyl chloride. From magnesium bis(manganese pentacarbonyl) and 4-chloro-3-methylpentene-2 there can be obtained α,β-dimethyl-2-butenylmanganese tetracarbonyl. From lithium manganese pentacarbonyl hydride and β-cyclohexylallyl bromide there can be obtained β-cyclohexylallyl manganese tetracarbonyl. From barium bis(manganese pentacarbonyl) and 1-chlorooctene-2 there can be obtained 2-octenylmanganese tetracarbonyl. Substituting 3-chlorooctene-1 the same product will be obtained. From sodium manganese pentacarbonyl and 1-bromo-5-(4-methylphenyl)pentene-2 there can be obtained 5-(p-tolyl)-2-pentenylmanganese tetracarbonyl. Substituting α,γ-diphenylallyl chloride there can be obtained α,γ-diphenylallylmanganese tetracarbonyl. Substituting α-methyl-γ-cyclohexylallyl chloride there can be obtained α-methyl-γ-cyclohexylallyl (i.e., 3-cyclohexyl-2-butenyl)manganese tetracarbonyl.

The foregoing detailed description has been given for clearness of understanding only and no unnecessary limitations are to be understood therefrom. The invention is not limited to the exact details shown and described for obvious modifications will occur to those skilled in the art.

This application is a continuation-in-part of my copending application Serial No. 791,031, filed February 4, 1959, now abandoned.

The embodiments of the invention in which an exclusive property or privilege is claimed are defined as follows:

1. Glycerylmanganese tetracarbonyls essentially free from pentacarbonyls and tricarbonyls, the organic moiety of said tetracarbonyls being bonded to manganese by nonclassical metal to ligand links, the 1- and 3-carbons of said organic moiety each being joined to two members of the class consisting of hydrogen, not more than one halogen being on any one carbon, and halogen, monovalent hydrocarbyl of 1–8 carbon radicals free of aliphatic unsaturation, and the 2-carbon of said organic moiety carrying one member of said class.

2. Compounds represented by the formula

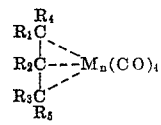

wherein $R_1$, $R_2$, $R_3$, $R_4$, and $R_5$ are the same or different and represent members of the class consisting of hydrogen, halogen, not more than one halogen being on any one carbon and monovalent hydrocarbyl radicals of 1–8 carbons, said radicals being free of aliphatic unsaturation, and the dotted lines represent non-classical manganese to ligand moiety linkages involving π-electrons, said compounds being essentially free of pentacarbonyls and tricarbonyls.

3. A glycerylmanganese tetracarbonyl of formula $C_3H_5Mn[CO]_4$, said carbonyl being essentially free from allylmanganese pentacarbonyl and tricarbonyl.

4. α-Methylglycerylmanganese tetracarbonyl essentially free from crotylmanganese pentacarbonyl and tricarbonyl.

5. Process which comprises reacting a metal salt of manganese pentacarbonyl hydride, said metal salt being selected from the group consisting of alkali and alkaline earth metal salts, with a 2-alkenyl compound of the formula

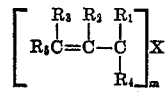

wherein the R's are members of the class consisting of hydrogen, halogen, not more than one halogen on any one carbon, and monovalent hydrocarbyl radicals of 1–8 carbons, said radicals being free of aliphatic unsaturation, X represents a member of the group consisting of chloride, bromide, iodide, sulfate, acetate, phosphate and propionate, and $m$ is a whole integer, and continuing the reaction until substantially one molar proportion of gaseous carbon monoxide per molar proportion of manganese is evolved.

No references cited.